United States Patent
Yao et al.

(10) Patent No.: US 11,900,622 B2
(45) Date of Patent: Feb. 13, 2024

(54) DEPTH SUPERRESOLUTION DEVICE, DEPTH SUPERRESOLUTION METHOD, AND PROGRAM

(71) Applicant: NIPPON TELEGRAPH AND TELEPHONE CORPORATION, Tokyo (JP)

(72) Inventors: Yasuhiro Yao, Tokyo (JP); Shingo Ando, Tokyo (JP); Kana Kurata, Tokyo (JP); Hitoshi Niigaki, Tokyo (JP); Atsushi Sagata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 373 days.

(21) Appl. No.: 17/425,916

(22) PCT Filed: Jan. 27, 2020

(86) PCT No.: PCT/JP2020/002700
§ 371 (c)(1),
(2) Date: Jul. 26, 2021

(87) PCT Pub. No.: WO2020/158646
PCT Pub. Date: Aug. 6, 2020

(65) Prior Publication Data
US 2022/0198690 A1 Jun. 23, 2022

(30) Foreign Application Priority Data
Jan. 30, 2019 (JP) ................................. 2019-014286

(51) Int. Cl.
*G06T 7/50* (2017.01)
*G06T 3/40* (2006.01)

(52) U.S. Cl.
CPC .............. *G06T 7/50* (2017.01); *G06T 3/4046* (2013.01); *G06T 2200/04* (2013.01); *G06T 2207/20084* (2013.01)

(58) Field of Classification Search
CPC ...... H04N 13/00–398; G06T 7/50–596; G06T 2200/04; G06T 2207/20084; G06T 3/4046
See application file for complete search history.

(56) References Cited

U.S. PATENT DOCUMENTS

2014/0267243 A1* 9/2014 Venkataraman ........ G06T 7/557
345/419
2014/0354681 A1* 12/2014 Xiong .................... G06T 7/521
345/619

(Continued)

OTHER PUBLICATIONS

Ma et al. (2018) "Sparse-to-Dense: Depth Prediction from Sparse Depth Samples and a Single Image" IEEE International Conference on Robotics and Automation (ICRA), May 21, 2018.

(Continued)

*Primary Examiner* — Sean T Motsinger (57) ABSTRACT

Dense depth information can be generated using only a monocular image and sparse depth information.

A depth hyper-resolving apparatus 100 includes: an input data processing unit 22 that outputs a hierarchical input image and hierarchical input depth information by resolution conversion in accordance with a predetermined number of tiers for an input image and input depth information; a depth continuity estimation unit 24 that derives hierarchical estimated depth continuity based on the hierarchical input image; a depth continuity mask deriving unit 26 that outputs a hierarchical depth continuity mask representing values of locations depending on whether a depth is continuous based on the hierarchical input image and the hierarchical estimated depth continuity; and a cost function minimization (Continued)

unit 30 that derives hyper-resolved depth information to minimize a cost function expressed by using the hierarchical input depth information, the hierarchical depth continuity mask, and the hyper-resolved depth information.

10 Claims, 11 Drawing Sheets

(56) References Cited

U.S. PATENT DOCUMENTS

| | | | |
|---|---|---|---|
| 2015/0288945 A1* | 10/2015 | Nisenzon | H04N 13/243 |
| | | | 348/48 |
| 2016/0337635 A1* | 11/2016 | Nisenzon | H04N 13/243 |
| 2017/0318280 A1* | 11/2017 | Nisenzon | H04N 13/243 |
| 2022/0198690 A1* | 6/2022 | Yao | G06T 3/4046 |

OTHER PUBLICATIONS

Kuschk et al. (2017) "Real-time Variational Stereo Reconstruction with Applications to Large-Scale Dense SLAM" 2017 IEEE Intelligent Vehicles Symposium (IV), Jun. 11, 2017, pp. 1348-1355.

* cited by examiner

(A) TRANSFORM OF INPUT DEPTH INFORMATION — POINT GROUP FORMAT: EACH POINT HAS A 3-DIMENSIONAL POSITION OF x, y, z (B) DEPTH MAP FORMAT: EACH PIXEL HAS DEPTH VALUE (0 WHEN HAVING NO DEPTH)

COST MINIMIZATION INITIAL VALUE $D'$
(WHEN PIXELS WITH NO VALUE AT $D\_0$ ARE
INITIALIZED WITH RANDOM NUMBER)

(B)

COST MINIMIZATION INITIAL VALUE $D'$
(WHEN PIXELS WITH NO VALUE AT $D\_0$ ARE
INITIALIZED WITH A CONSTANT)

DEPTH SUPERRESOLUTION DEVICE, DEPTH SUPERRESOLUTION METHOD, AND PROGRAM

CROSS-REFERENCE TO RELATED APPLICATIONS

This application is a U.S. 371 Application of International Patent Application No. PCT/JP2020/002700, filed on 27 Jan. 2020, which application claims priority to and the benefit of JP Application No. 2019-014286, filed on 30 Jan. 2019, the disclosures of which are hereby incorporated herein by reference in their entireties.

TECHNICAL FIELD

The present invention relates to a depth hyper-resolving apparatus, a depth hyper-resolving method, and a program.

BACKGROUND ART

Depth information measured by light detection and ranging (LiDAR) or the like is accurate but sparse, and thus densification may be required for use. Thus, there is proposed a technique for deriving dense depth information from sparse depth information and an image obtained by measurement.

There is known a technique for generating dense depth information by processing an image and sparse depth information as input in a deep neural network (DNN) (for example, Non Patent Literature 1). Highly dense depth information is estimated by using an image and sparse depth information as input with the DNN that has been given dense depth information as a correct solution and learned.

Furthermore, there is also known a technique for generating dense depth information by using a stereo image and sparse depth information and to minimize a cost function (see, for example, Non Patent Literature 2). In this technique, dense depth information that reduces an error between the dense depth information and a parallax of the stereo image and an error between the dense depth information and the measured sparse depth information is derived while maintaining depth continuity.

CITATION LIST

Non Patent Literature

Non Patent Literature 1: M. Fengchang, and K. Sertac, "Sparse-to-Dense: Depth Prediction from Sparse Depth Samples and a Single Image", IEEE International Conference on Robotics and Automation (ICRA), 2018

Non Patent Literature 2: G. Kuschk, A. Bozic and D. Cremers, "Real-time variational stereo reconstruction with applications to large-scale dense SLAM," 2017 IEEE Intelligent Vehicles Symposium (IV), Los Angeles, CA, 2017, pp. 1348-1355.

SUMMARY OF THE INVENTION

Technical Problem

As in Non Patent Literature 1, in a method for generating dense depth information by processing with the DNN, a large amount of training data is required. The training data required in this case must be data obtained by measuring an image and depth information simultaneously. In addition, there is a need to generate dense depth information by some method to make the dense depth information correct data. Although Non Patent Literature 1 also proposes a method of automatically generating dense depth information from images and sparse depth information continuously measured in a time series manner and using the dense depth information as correct data, it has been reported that performance of the DNN that has learned with dense depth information generated manually is higher. Images and depth information required for hyper-resolving of depth information by the DNN as in this technique are difficult to obtain compared to image only data.

In the technique of Non Patent Literature 2, a stereo image and sparse depth information are required as input. As such, it is not applicable under situations where dense depth information must be generated from a monocular image and sparse depth information, and can only be used in limited situations.

In light of the foregoing circumstances, an object of the present invention is to provide a depth hyper-resolving apparatus, a depth hyper-resolving method, and a program capable of generating dense depth information using only a monocular image and sparse depth information.

Means for Solving the Problem

An aspect of the present invention is a depth hyper-resolving apparatus including: an input data processing unit configured to output a hierarchical input image and hierarchical input depth information by resolution conversion in accordance with a predetermined number of tiers for an input image and input depth information: a depth continuity estimation unit configured to derive a hierarchical estimated depth continuity based on the hierarchical input image: a depth continuity mask deriving unit configured to output, based on the hierarchical input image and the hierarchical estimated depth continuity, a hierarchical depth continuity mask representing values of locations depending on whether a depth is continuous; and a cost function minimization unit configured to derive hyper-resolved depth information to minimize a cost function expressed by using the hierarchical input depth information, the hierarchical depth continuity mask, and the hyper-resolved depth information.

One aspect of the present invention is a depth hyper-resolving method including: outputting, at an input data processing unit, a hierarchical input image and hierarchical input depth information by resolution conversion in accordance with a predetermined number of tiers for an input image and input depth information: deriving, at a depth continuity estimation unit, hierarchical estimated depth continuity based on the hierarchical input image: outputting, at a depth continuity mask deriving unit, based on the hierarchical input image and the hierarchical estimated depth continuity, a hierarchical depth continuity mask representing values of locations depending on whether a depth is continuous; and deriving, at a cost function minimization unit, hyper-resolved depth information to minimize a cost function expressed by using the hierarchical input depth information, the hierarchical depth continuity mask, and the hyper-resolved depth information.

According to an aspect of the present invention, the input data processing unit converts the input image and the input depth information into an appropriate format, and derives the hierarchical input image and the hierarchical input depth information by resolution conversion in accordance with the predetermined number of tiers (N≥1).

The depth continuity estimation unit derives the hierarchical estimated depth continuity based on the hierarchical input image. The depth continuity mask deriving unit outputs the hierarchical depth continuity mask representing values of locations depending on whether a depth is continuous based on the hierarchical input image and the hierarchical estimated depth continuity.

The cost function minimization unit performs repetitive optimization calculation to minimize a cost function expressed by using the hierarchical input depth information, the hierarchical estimated depth continuity, the hierarchical depth continuity mask, and the hyper-resolved depth information to derive the hyper-resolved depth information.

In this way, the hierarchical estimated depth continuity is derived based on the hierarchical input image, the hierarchical depth continuity mask is output based on the hierarchical input image and the hierarchical estimated depth continuity, and repetitive optimization calculation is performed to minimize the cost function expressed by using the hierarchical input depth information, the hierarchical depth continuity mask, and the hyper-resolved depth information to derive the hyper-resolved depth information, thereby allowing dense depth information to be generated using only a monocular image and sparse depth information. Note that in learning a model for estimating depth information, stereo images may be used.

One aspect of the present invention is the depth hyper-resolving apparatus described above, further including an initial value deriving unit configured to output a cost function minimization initial value based on the hierarchical input depth information, and the cost function minimization unit derives the hyper-resolved depth information to minimize the cost function using the cost function minimization initial value.

One aspect of the present invention is a program for causing a computer to function as the depth hyper-resolving apparatus described above.

Effects of the Invention

As described above, the present invention provides the effect that dense depth information can be generated using only a monocular image and sparse depth information.

DESCRIPTION OF EMBODIMENTS

Hereinafter, a depth hyper-resolving apparatus according to an embodiment of the present invention will be described in detail with reference to the drawings.

Configuration of Depth Hyper-Resolving Apparatus

Figure 1:
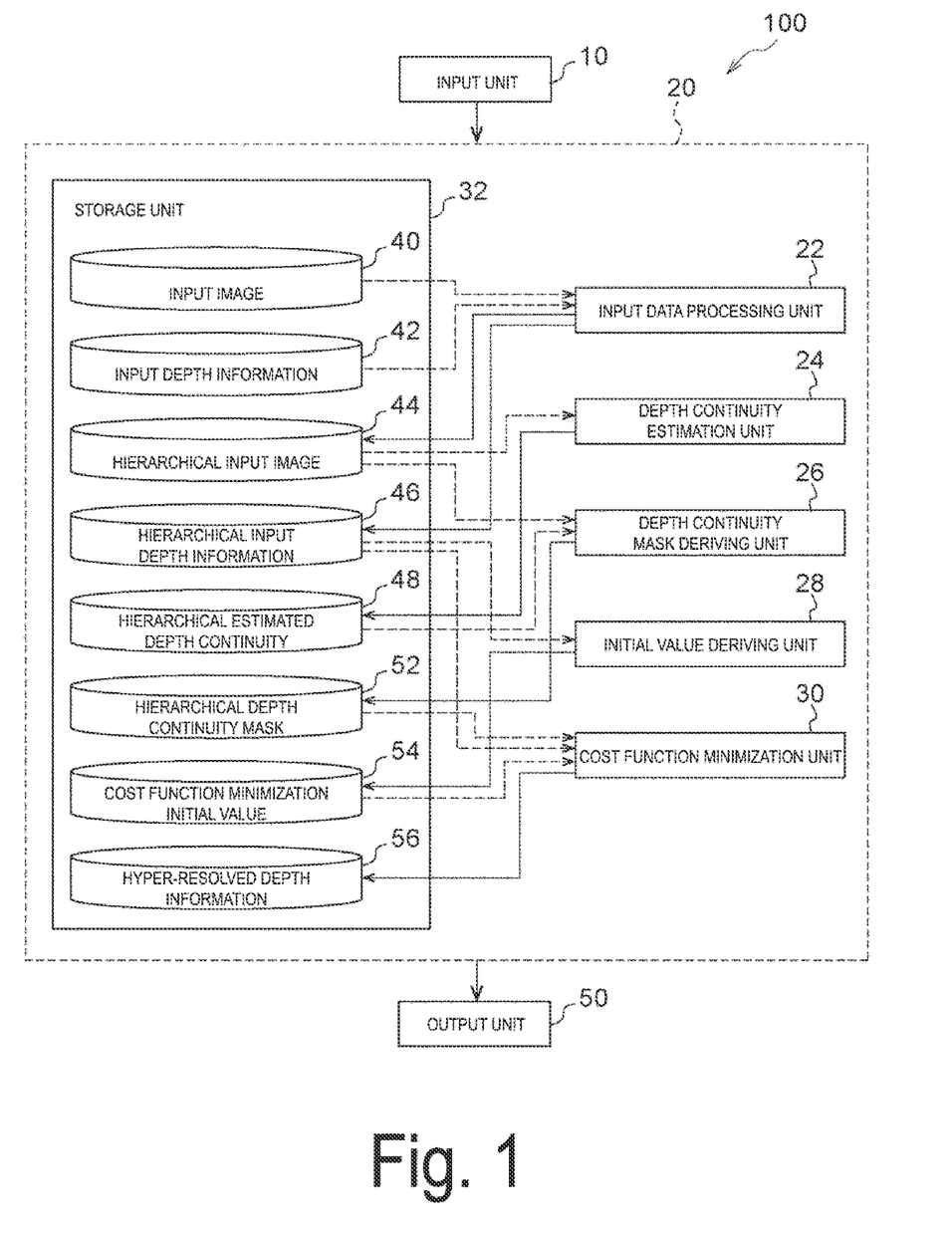
FIG. 1 is a diagram illustrating an example of a configuration of a depth hyper-resolving apparatus according to a present embodiment.

FIG. 1 is a schematic diagram illustrating a configuration of the embodiment. A depth hyper-resolving apparatus 100 illustrated in this figure includes an input unit 10, an operation unit 20, and an output unit 50.

The operation unit 20 includes functional units, that is, an input data processing unit 22, a depth continuity estimation unit 24, a depth continuity mask deriving unit 26, an initial value deriving unit 28, and a cost function minimization unit 30. The functional units are realized, for example, by a CPU or a GPU executing a program. In addition, the depth hyper-resolving apparatus 100 includes a device such as a functional unit.

The operation unit 20 includes a storage unit 32. The storage unit 32 stores an input image 40 and input depth information 42 input by the input unit 10.

The input data processing unit 22 outputs a hierarchical input image 44 and hierarchical input depth information 46 by converting the input image 40 and the input depth information 42 into an appropriate format and performing resolution conversion in accordance with a predetermined number of tiers (N≥1), and stores the output results in the storage unit 32.

The depth continuity estimation unit 24 derives hierarchical estimated depth continuity 48 based on the hierarchical input image 44 and stores the derived continuity in the storage unit 32.

Based on the hierarchical input image 44 and the hierarchical estimated depth continuity 48, the depth continuity mask deriving unit 26 outputs a hierarchical depth continuity mask 52 representing values of locations depending on whether a depth is continuous, and stores the output mask in the storage unit 32.

The initial value deriving unit 28 outputs a cost function minimization initial value 54 based on the hierarchical input depth information 46, and stores the output value in the storage unit 32.

The cost function minimization unit 30 performs repetitive optimization calculation using the cost function minimization initial value 54 to minimize a cost function expressed by hierarchical input depth information, a hierarchical depth continuity mask, and hyper-resolved depth information to derive hyper-resolved depth information 56 and store the derived information in the storage unit 32.

Effect of Depth Hyper-Resolving Apparatus

Figure 2:
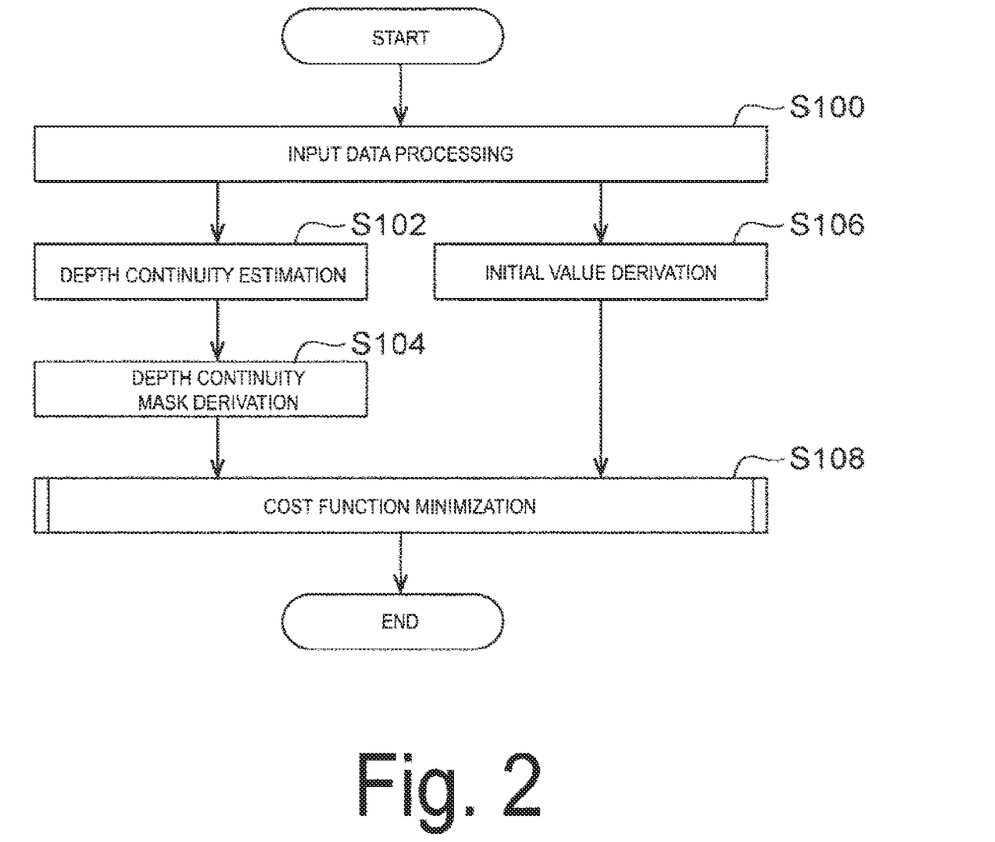
FIG. 2 is a flowchart illustrating overall processing of the depth hyper-resolving apparatus.

FIG. 2 is a flowchart illustrating processing in the embodiment. As illustrated, processing of depth continuity estimation and depth continuity mask derivation and processing of initial value derivation may be performed in parallel.

In step S100, the input data processing unit 22 uses the input image 40 and the input depth information 42 as input to derive the hierarchical input image 44 and the hierarchical input depth information 46 in accordance with a predetermined number of tiers (N≥1).

Figure 3:
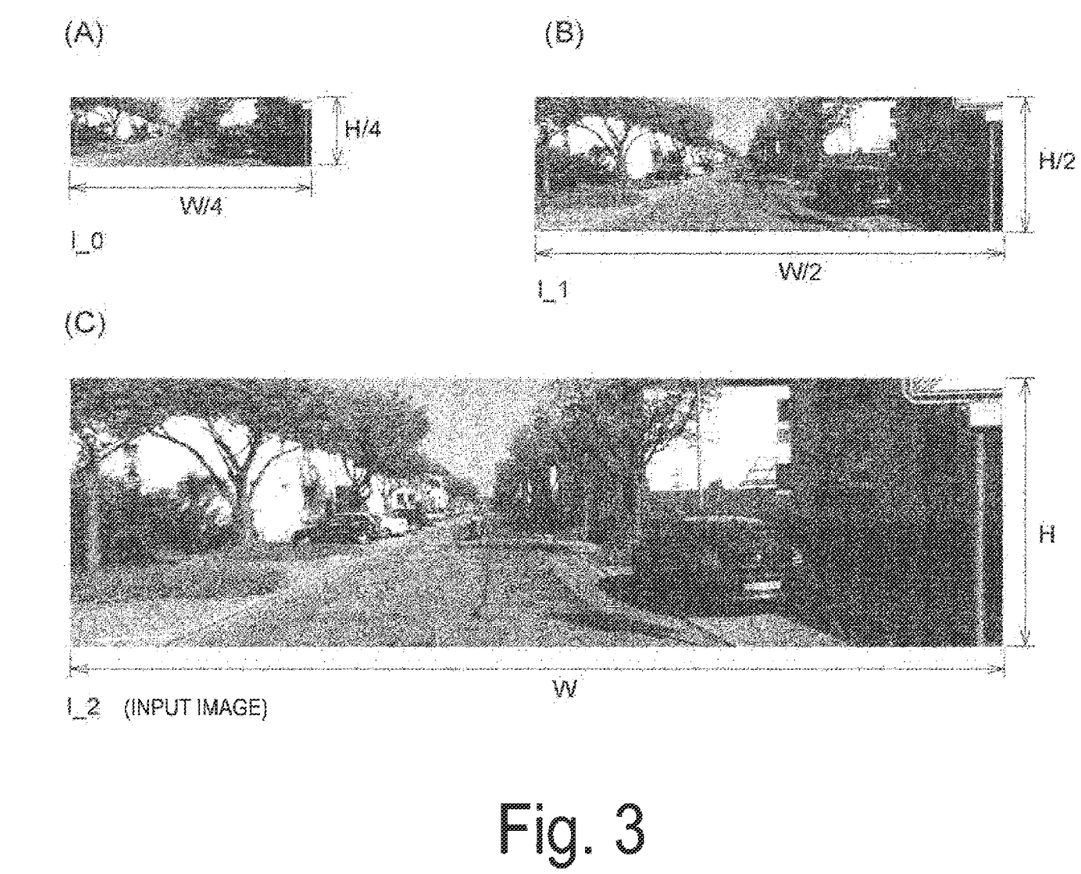
FIG. 3 is a diagram illustrating an example of a hierarchical input image output by an input data processing unit.

Processing of the input image 40 by the input data processing unit 22 will be described with reference to FIG. 3. It is assumed that the input image 40 has a resolution of a width W and a height H (units: pixels). Hereinafter, it is assumed that the number of tiers is N and the index of the tiers is n. Here, n=0, 1, . . . , N−1 is satisfied. The input data processing unit 22 converts the resolution of the input image 40 into a width W_n=W/2^(N−n) and a height H_n=H/2^(N−n), thereby generating an image I_n. Thus, N images are generated and stored as the hierarchical input image 44 in the storage unit 32. FIG. 3(A) to FIG. 3(C) illustrate the image I_n when the number of tiers N is 3. Note that when N is 1, the input image 40 with the width W and the height H is output without resolution conversion.

Figure 4:
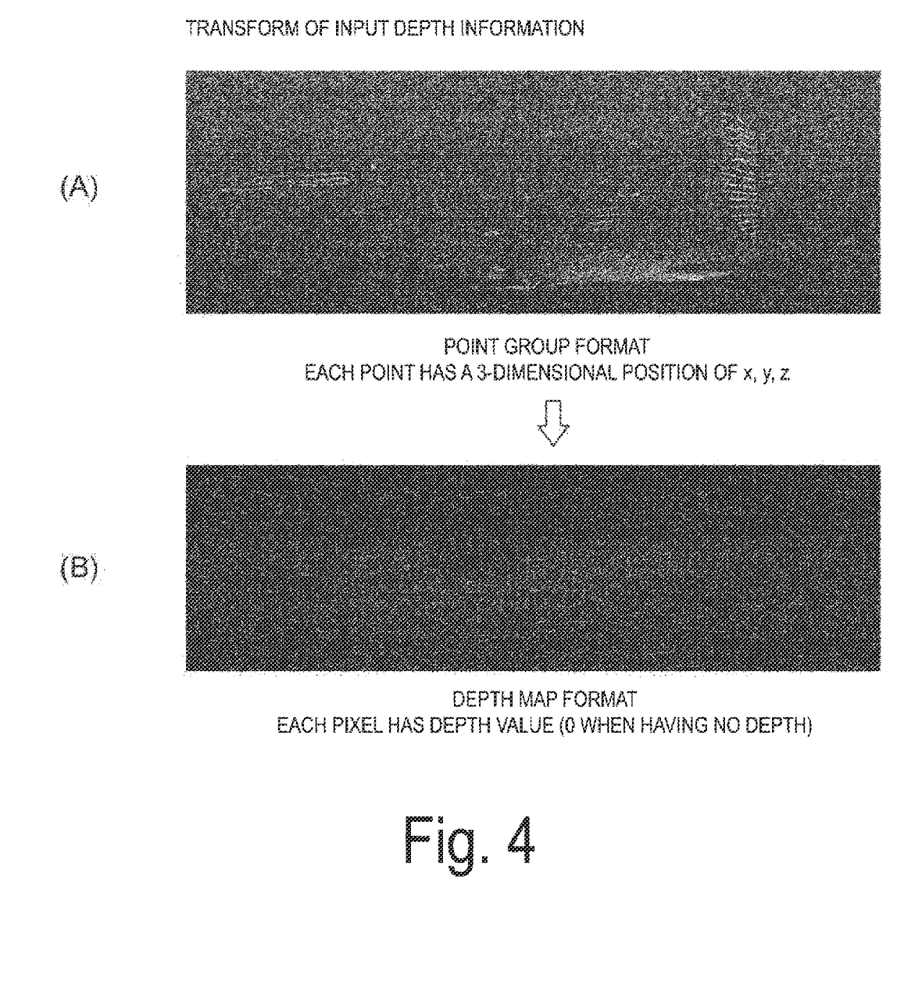
FIG. 4 is a diagram illustrating input and output of processing of converting input depth information of a point group format into a depth map format performed by the input data processing unit.
Figure 5:
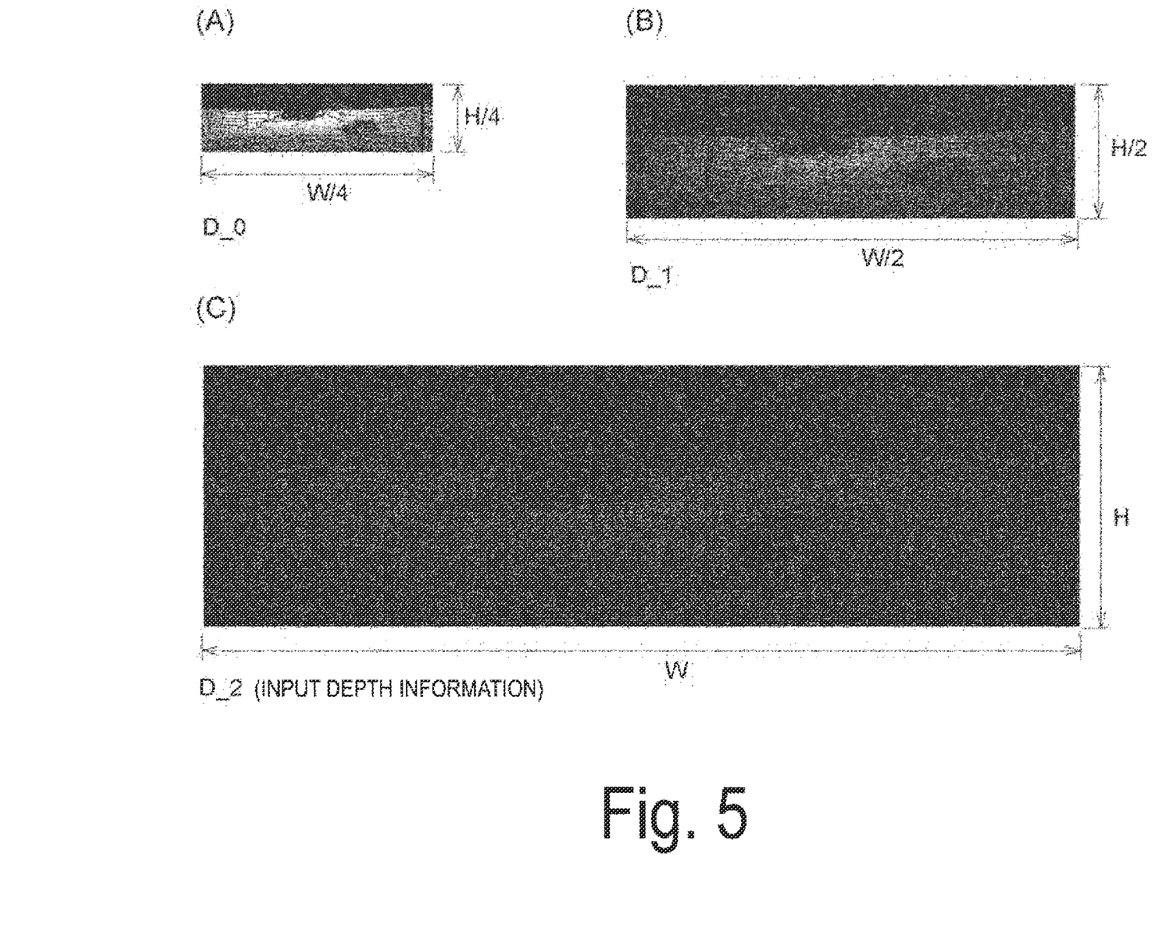
FIG. 5 is a diagram illustrating an example of hierarchical input depth information output by the input data processing unit.

Processing of the input depth information 42 in the input data processing unit 22 will be described with reference to FIGS. 4 and 5. The input depth information 42 is given in a point group format in which each point has three dimensional information of x, y, and z, or in a depth map format in which each pixel has a depth value. FIGS. 4(A) and 4(B) illustrate the input depth information 42 of the point group format and the input depth information 42 of the depth map format, respectively. If data is provided in the point group format, the input depth information 42 is converted into the depth map format using a projection matrix that projects the point group onto a camera image plane. The input depth information 42 of the depth map format has the resolution W and the height H. The resolution of the input depth information 42 of the depth map format is converted into a width W_n and a height H_n, thereby generating depth information D_n. Thus, N pieces of depth information of the depth map format are generated and stored as the hierarchical input depth information 46 in the storage unit 32. FIGS. 5(A) to 5(C) illustrate the depth information D_n in a case where the number of tiers N is 3. Note that when N is 1, the input depth information 42 having the width W and the height H is output without resolution conversion.

In step S102, the depth continuity estimation unit 24 derives the hierarchical estimated depth continuity 48 using the hierarchical input image 44 as input. Here, the estimated depth continuity is information having the same resolution as the image, and the derivative of the value correlates with the derivative of the depth. For example, the estimated depth continuity may be obtained using a DNN that estimates depth information from an image. As in Non Patent Literature 3 and Non Patent Literature 4, the DNN that estimates depth information can learn only from images, so that training data is easily obtained. Specifically, the DNN that estimates depth information from a monocular image learns using stereo images.

Non Patent Literature 3: Godard, Clement, Oisin Mac Aodha, and Gabriel J. Brostow. "Unsupervised Monocular Depth Estimation with Left-right Consistency." CVPR. Vol. 2. No. 6, 2017.

Non Patent Literature 4: Garg, Ravi et al. "Unsupervised CNN for Single View Depth Estimation: Geometry to the Rescue." Lecture Notes in Computer Science (2016): 740-756. Crossref. Web.

In addition, the estimated depth continuity can be obtained by dividing an image into regions by a region division means that does not need to learn, such as, for example, k-means clustering. In this case, learning of the DNN is unnecessary.

Figure 6:
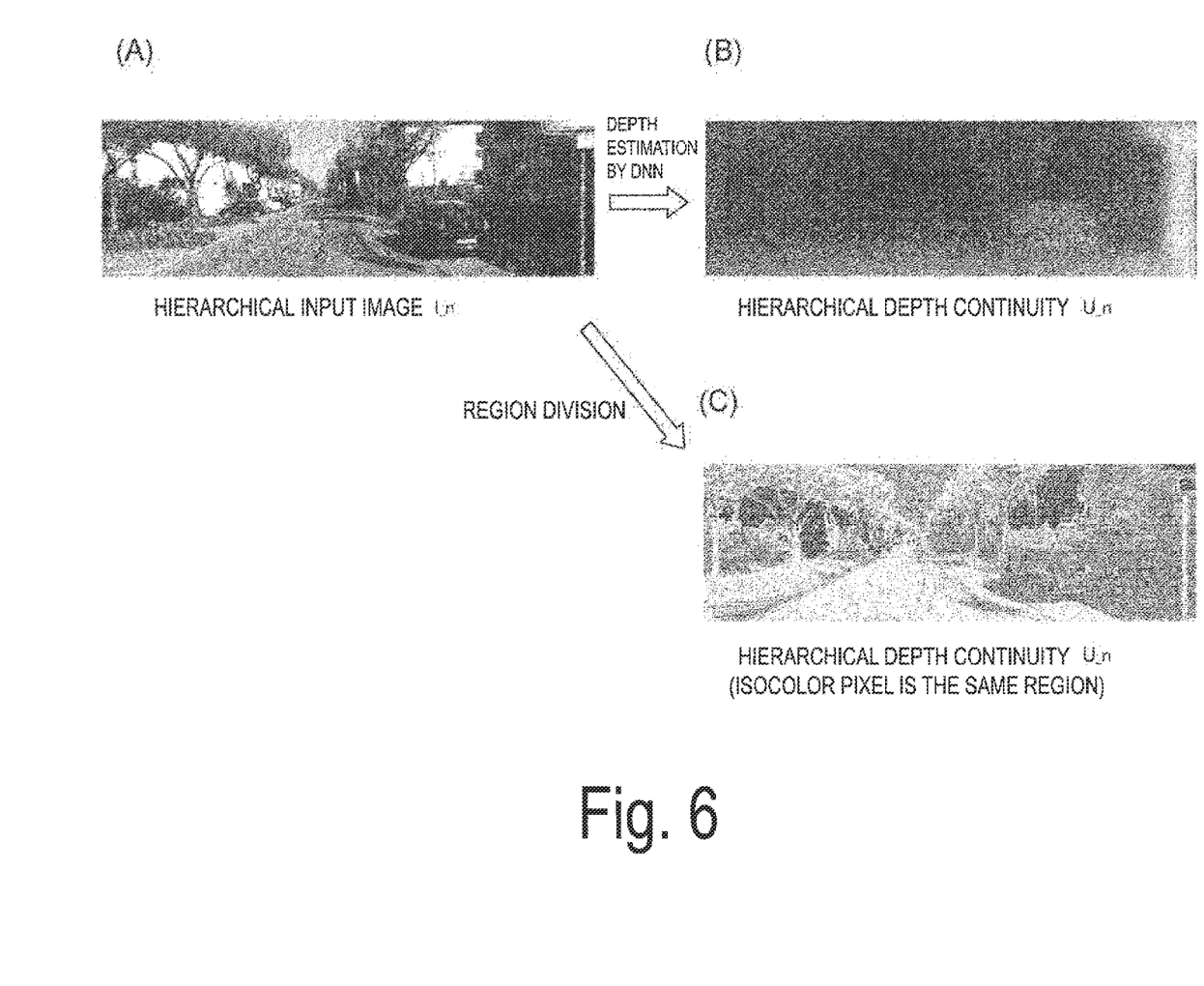
FIG. 6 is a diagram illustrating input and output of processing of a depth continuity estimation unit.

FIGS. 6(A) to 6(C) illustrate derivation of the estimated depth continuity. The depth continuity information is derived for an input image of each tier, so that N pieces of depth continuity information U_n (n=0, 1, . . . , N) are output and stored as the hierarchical estimated depth continuity 48 in the storage unit 32.

In step S104, the depth continuity mask deriving unit 26 outputs the hierarchical depth continuity mask 52 using the hierarchical input image 44 and the hierarchical estimated depth continuity 48 as input. The depth continuity mask is data that has a large value at a location where a depth is estimated to be continuous and has a small value (≥0) at a location where a depth is estimated to be discontinuous. A depth continuity mask G_n having corresponding resolution is generated for each tier, so that N depth continuity masks are generated in total. The method for deriving the depth continuity mask G_n is not limited, but two examples of specific derivation equations of G_n are shown.

[Math. 1]

$$G\_n = \exp(-(\alpha\_I \|\nabla I\_n\|^{\beta\_I} + \alpha\_U \|\nabla U\_n\|^{\beta\_U}))$$ (Equation 1)

[Math. 2]

$$G\_n = \exp(-(\alpha\_I \|\nabla I\_n\|^{\beta\_I} \times \alpha\_U \|\nabla U\_n\|^{\beta\_U}))$$ (Equation 2)

Note that α_I, β_I, α_U, and β_U each are any constant equal to or greater than 0. Equations 1 and 2 above are calculated for each element of the depth continuity mask. However, ∇I_n and ∇U_n are values obtained by calculating a derivative value with an adjacent image.

Figure 7:
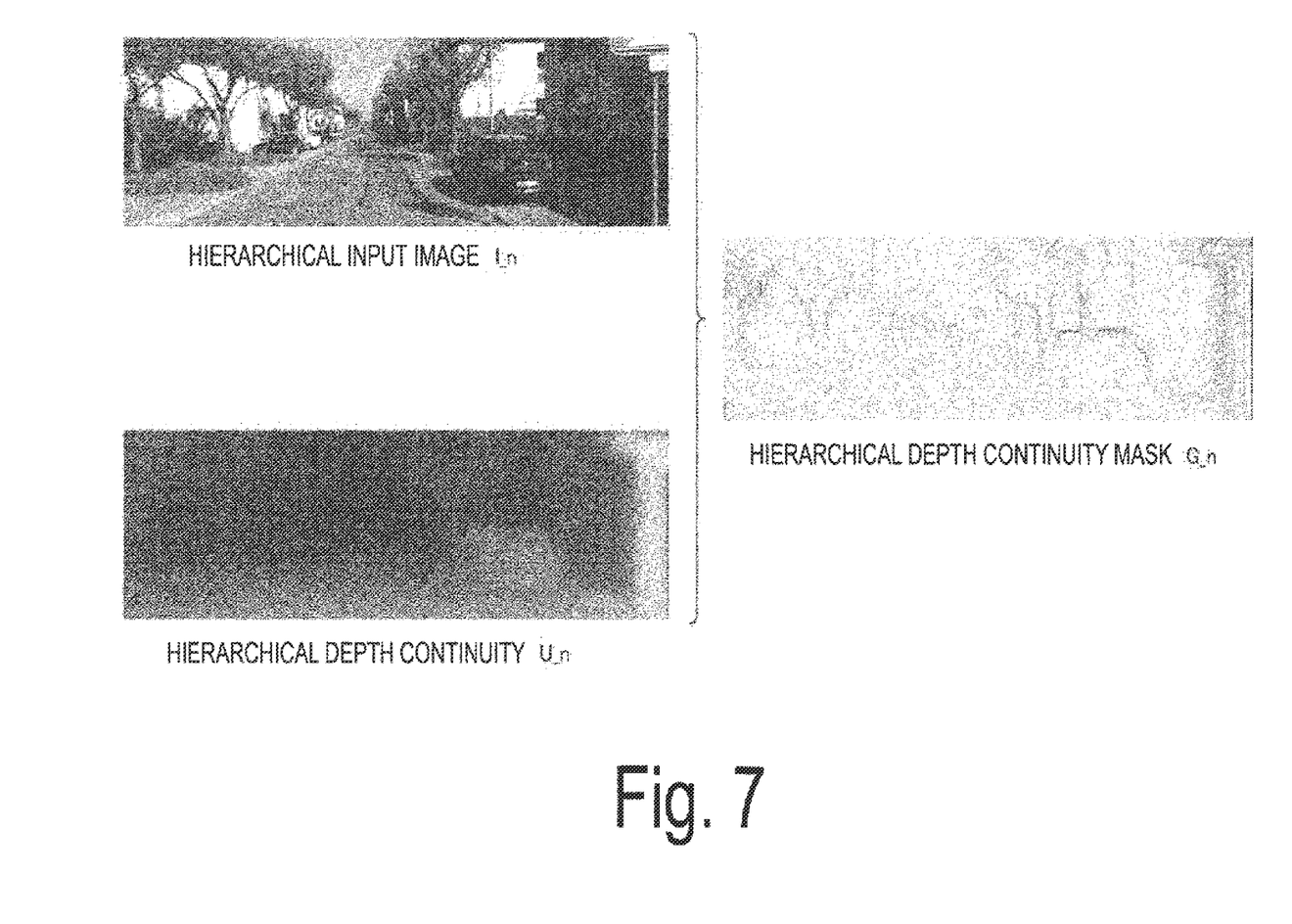
FIG. 7 is a diagram illustrating input and output of processing of a depth continuity mask deriving unit.

FIG. 7 illustrates the input and output of the depth continuity mask deriving unit 26. The generated hierarchical depth continuity mask 52 is stored in the storage unit 32.

In step S106, the initial value deriving unit 28 derives a cost function minimization initial value D' from the D_0, which is the data of the zeroth tier of the hierarchical input depth information 46. D' is derived by a weighting average as shown below.

[Math. 3]

$$D'(\hat{x}) = \frac{\sum_{\hat{x}' \in \Omega, D\_0(\hat{x}') > 0} D\_0(\hat{x}' \cdot \exp\left(-\frac{(\hat{x} - \hat{x}')^{\wedge}2}{2\sigma^2}\right)}{\sum_{\hat{x}' \in \Omega, D\_0(\hat{x}') > 0} \exp\left(-\frac{(\hat{x} - \hat{x}')^{\wedge}2}{2\sigma^2}\right)}$$ (Equation 3)

Figure 8:
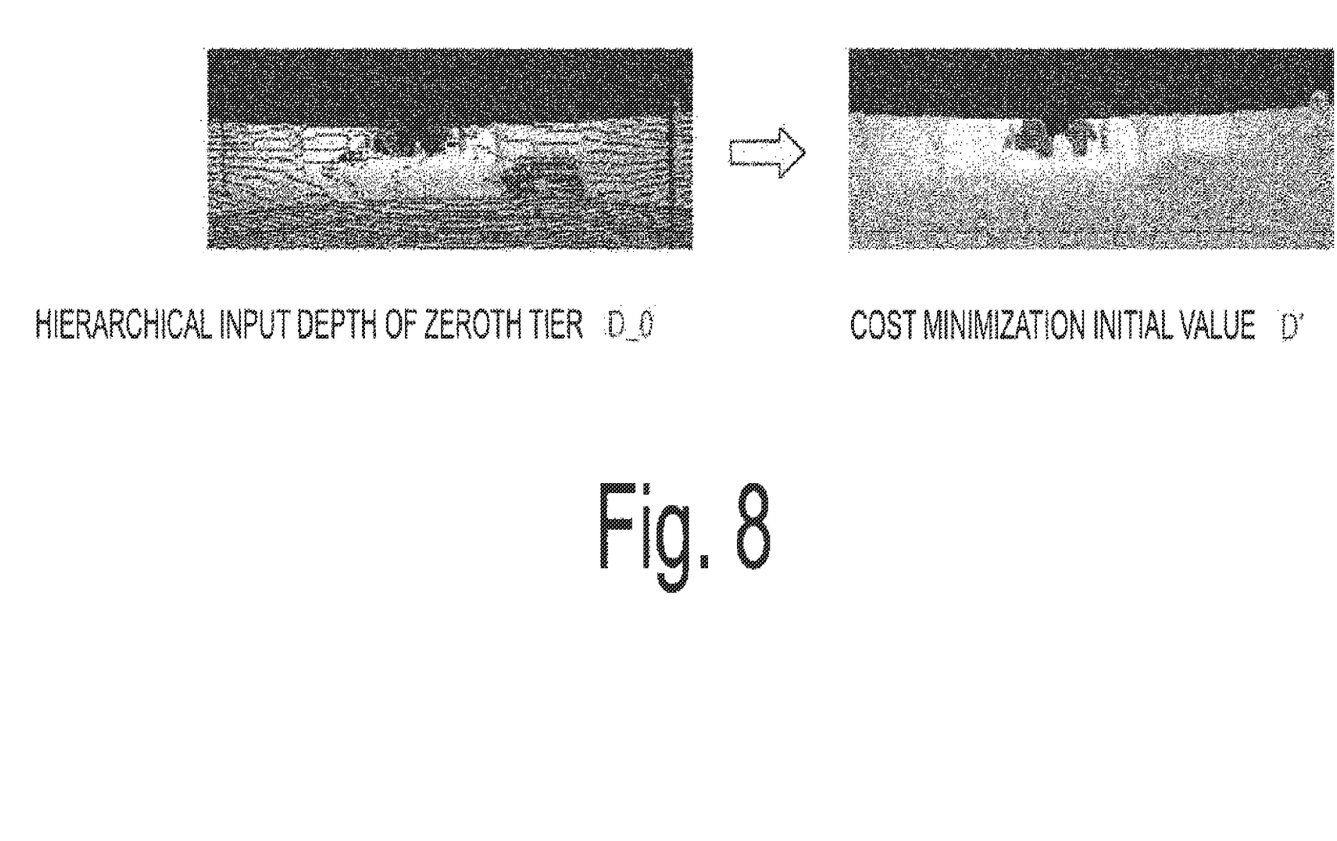
FIG. 8 is a diagram illustrating input and output of an initial value deriving unit.

Here, $\hat{x}$, each are 2-dimensional coordinates on the image plane, and $\sigma^2$ is a variance value when taking a weighting average and is any value greater than 0. The output cost function minimization initial value 54 is stored in the storage unit 32. FIG. 8 illustrates input and output of the initial value deriving unit 28.

Figure 9:
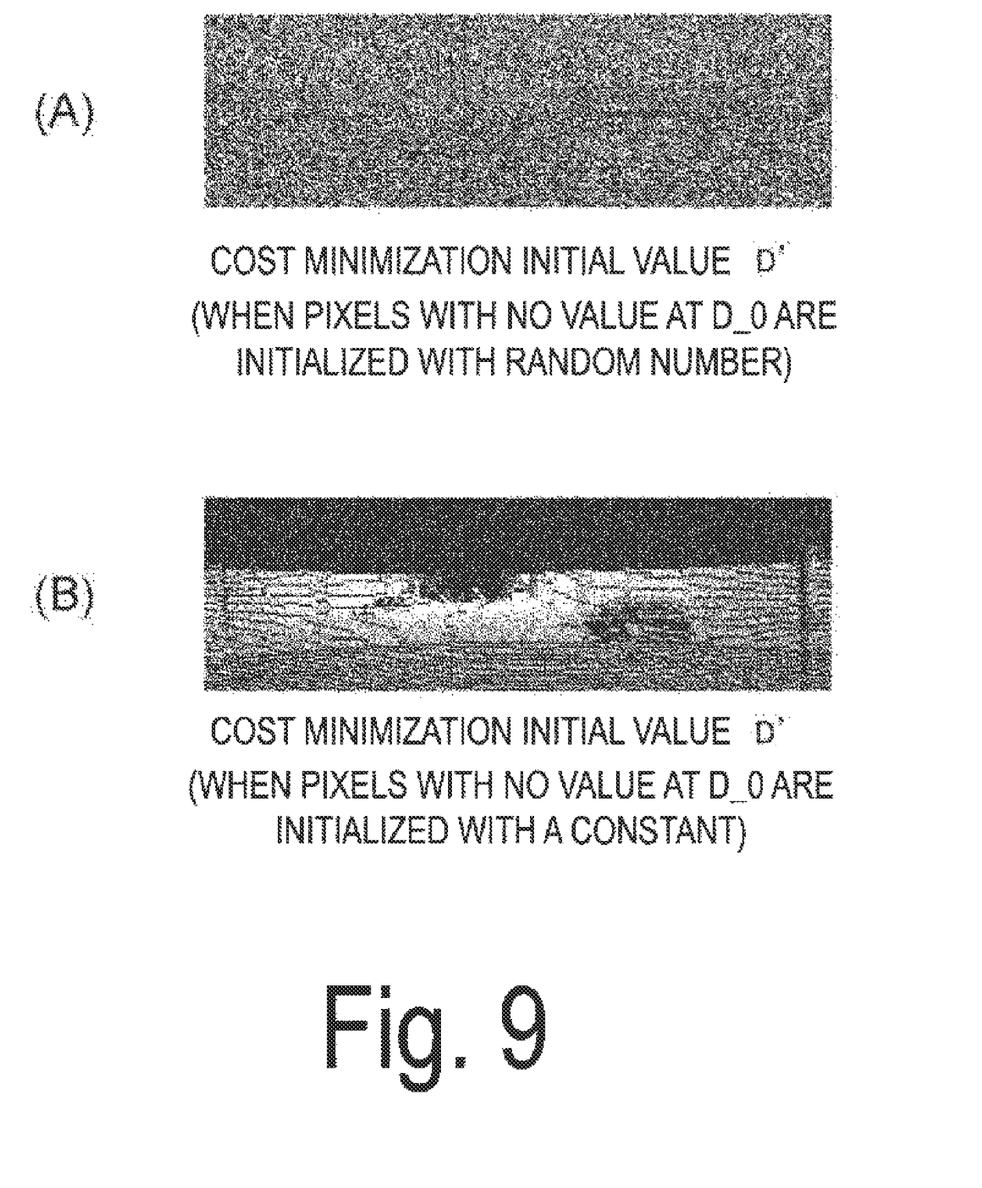
FIG. 9 is a diagram illustrating an example of a cost function minimization initial value when the initial value deriving unit is not interposed.

Note that the embodiment may be configured not to include the initial value deriving unit 28. In embodiments without the initial value deriving unit 28, the cost function minimization initial value D' can be derived by, for example, a method of substituting a random value or substituting a constant value into a pixel without the value of D_0, which is the data of the zeroth tier of the hierarchical input depth information 46. The cost function minimization initial value 54 derived in this manner is illustrated in FIGS. 9(A) and 9(B).

In step S108, the cost function minimization unit 30 uses the hierarchical input depth information 46, the hierarchical depth continuity mask 46, and the cost function minimization initial value 54 as input, derives the hyper-resolved depth information 56 through the repetitive optimization calculation, and outputs the hyper-resolved depth information 56 to the storage unit 32. The hyper-resolved depth information 56 is the final output of the present invention. In the cost function minimization unit 30, repetitive optimization processing is performed by the primal-dual algorithm described in Non Patent Literature 5.

Non Patent Literature 5: A. Chambolle and T. Pock. "A First-order Primal-dual Algorithm for Convex Problems with Applications to Imaging." Journal of the Mathematical Imaging and Vision 40.1 (2011), 120-145.

Figure 10:
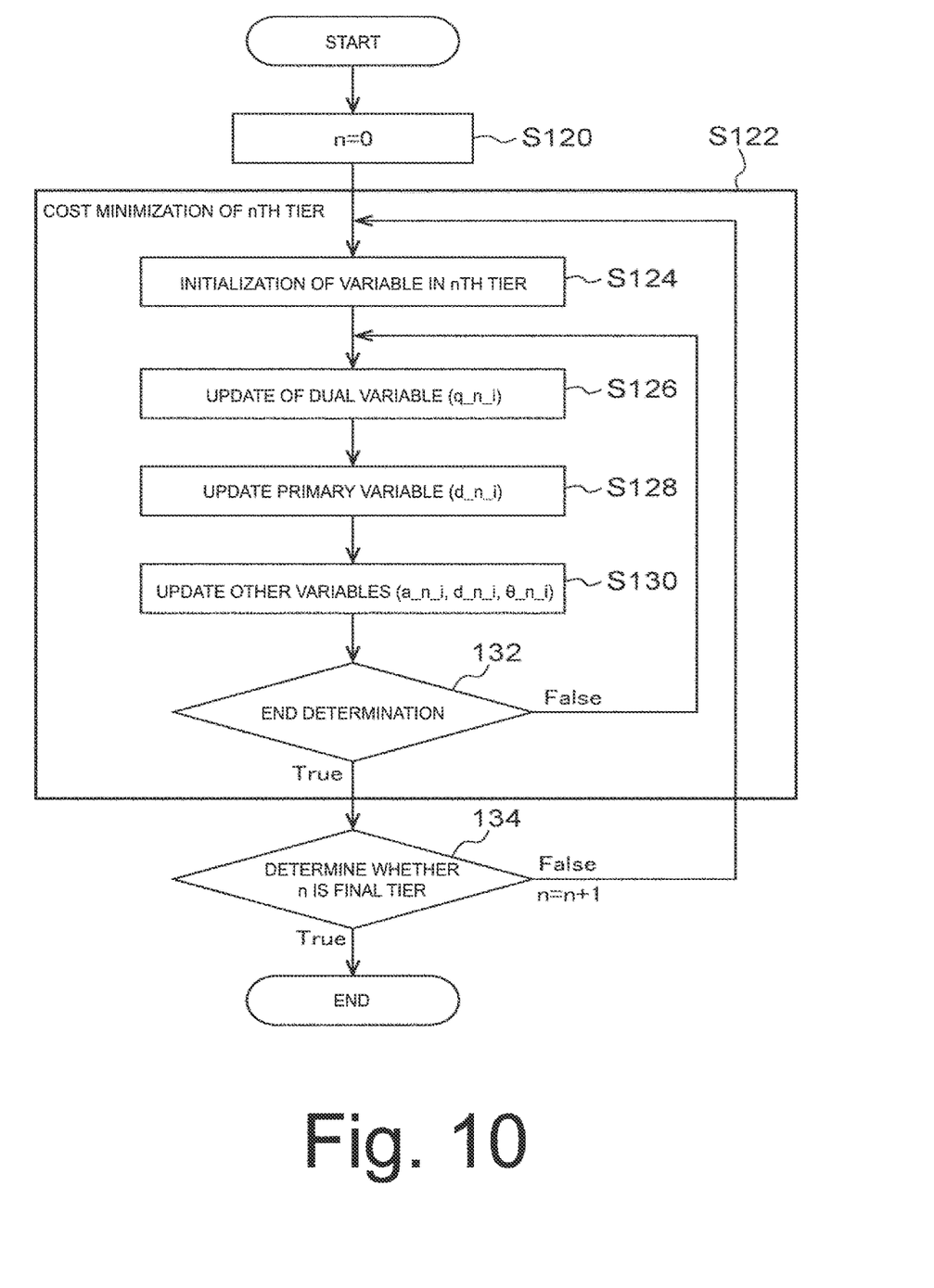
FIG. 10 is a flowchart illustrating processing of a cost function minimization unit.

FIG. 10 illustrates a flowchart of processing of the cost function minimization unit 30. Processing is started from the zeroth tier, and the optimization calculation is performed in a stepwise manner to the (N−1)th tier. Processing of the cost function minimization unit 30 will be described below with reference to the present flowchart of processing. Note that, in the cost function minimization unit 30, the cost function expressed by including a product obtained by computing the hierarchical depth continuity mask and the hyper-resolved depth information with an operator and a difference between the hyper-resolved depth information and the hierarchical estimated depth continuity is minimized based on the hierarchical depth continuity mask 52 and the hierarchical input depth information 46. Specifically, the following cost function is minimized.

[Math. 4]

$$\operatorname*{argmin}_{d\_n} \|G\_n L d\_n\|_\epsilon + \sum_{\hat{x} \in \Omega, D\_0(\hat{x}) > 0} \lambda |d\_n(\hat{x}) - D\_n(\hat{x})| \quad \text{(Expression 4)}$$

Here, L is a matrix format of a differential operator, ε and λ each are a constant equal to or greater than 0, and Ω is a plane in which hierarchical input depth information D_n is defined and is the same plane as the input image plane. $\|\cdot\|_\epsilon$ is Huber Norm and is defined by the following equation.

[Math. 5]

$$\|\hat{a}\|_\epsilon = \begin{cases} \dfrac{\|\hat{a}\|\_2^{\wedge 2}}{2\epsilon} & \text{if } \|x\|\_2 \le \epsilon \\ \|\hat{a}\|\_1 - \dfrac{\epsilon}{2} & \text{otherwise} \end{cases} \quad \text{(Equations 5)}$$

To minimize Equation 4, variables q_n, a_n, and θ are introduced as shown in the following expressions, and expression transform known as Legendre-Fenchel transform or Quadratic Relaxation is performed.

[Math. 6]

$$\operatorname*{argmin}_{d\_n} \operatorname*{sup}_{\|q\_n\| \le 1} < G\_n L D\_n, \quad \text{(Expression 6)}$$

$$q\_n > \frac{-\epsilon}{2}\|q_n\|_2 + \sum_{\hat{x} \in \Omega, D\_0(\hat{x})>0} \lambda |d\_n(\hat{x}) - D\_n(\hat{x})|$$

-continued

[Math. 7]

$$\operatorname*{argmin}_{d\_n\_u\_n \|q\_n\| \le 1} \operatorname*{sup} \; < G\_n L D\_n, q\_n > \quad \text{(Expression 7)}$$

$$\frac{-\epsilon}{2}\|q_n\|_2 + \sum_{\hat{x} \in \Omega, D, n(\hat{x})>0} \lim_{q \to 0} |D\_n(\hat{x}) - a\_n(\hat{x})| \wedge 2 +$$

$$\lambda |d\_n(\hat{x}) \cdot D\_n(\hat{x})|$$

Here, sup is a function that outputs a supremum. The above expressions represent minimizing a cost function including a primary variable and a dual variable representing hyper-resolved depth information.

Hereinafter, the initial values of the variables in the nth tier are written as d_n_0, q_n_0, a_n_0, and
d̄_n_0.
In addition, the results of the optimization processing in the nth tier are written as d_n_end and q_n_end.

First, in step S120, initialization is performed so that n is 0.

In step S122, the variables in the nth tier are determined to minimize the cost function. Step S122 is achieved by step S124 to step S132 below.

In step S124, initialization of the variables in the nth tier is performed to determine initial values of the variables. A method for determining the initial values is free, and step S122 may be started with arbitrary initial values or optimization processing may be performed as long as the dimension of the array is correct. An example of the method for determining the initial values is given below. Hereinafter, it is assumed that the relationship K_n=W_n×H_n is satisfied.

When n is 0, d_0_0 is a vector obtained by deforming the cost function minimization initial value D' to K_0×1 dimension, and q_0_0 is an array in which all elements in K_0×2 dimension are 0,
d̄_0_0
is a vector equal to d_0_0, and a_0_0 is a vector equal to d_0_0.

When n is greater than 0, d_n_0 is a vector obtained by deforming the optimization result d_n−1_end of the (n−1)th tier into an array of H_{n−1}×W_{n−1} dimension, then expanding the deformed result to H_n×W_n (the value is determined by interpolation or a neighborhood value), and further deforming the expanded result to K_n×1 dimension. q_n_0 is a vector obtained by deforming q_n−1_end into an array of H_{n−1}×W_{n−1}×2 dimension, then expanding the deformed result to H_n×W_n (the value is determined by interpolation or a neighborhood value), and further deforming the expanded result to K_n×2 dimension.
d̄_n_0
is a vector equal to d_n_0, and α_n_0 is a vector equal to d_n_0.

As described above, the method for determining the initial values is free, and as long as the dimensions of the vector and the array are the same, the initial values may be set regardless of the method described above.

In step S126, the dual variable (q_n_i) is updated according to the following equation.

[Math. 8]

$$q\_n\_\{i+1\} = \Pi((q\_n\_i + \tau\_q G\_n L \bar{d}\_n\_i)/(1 + \tau\_q \epsilon))\Pi(p) = \frac{p}{\max(1, \|p\|\_2)} \quad \text{(Equation 8)}$$

Here, Equation 8 above is calculated for each element of the dual variable. However,
$G\_nL\bar{d}\_n\_i$
is calculated using multiple elements. Moreover, τ_q is a constant greater than 0.

In step S128, the primary variable (d_n_i) representing the hyper-resolved depth information is updated according to the following equation.

[Math. 9]

$$d\_n\_\{i+1\} = \left(q\_n - \tau\_d\left(G\_nL \wedge Tq\_n\_\{i+1\} + \frac{1}{\theta\_i}a\_n\_i\right)\right) / \left(1 + \frac{\tau\_d}{\theta\_i}\right) \quad \text{(Equation 9)}$$

Here, Equation 9 above is calculated for each element of the primary variable. However,
$G\_nL\^{}Tq\_n\_\{i+1\}$
is calculated using multiple elements. ^T represents transposition of the first dimension and the second dimension of the three-dimensional array (with dimensional indices as 0, 1, and 2), and τ_d is a constant greater than 0. Note that, as described in Non Patent Literature 4, τ_q and τ_d must satisfy the following.

[Math. 10]

$$\tau\_q\,\tau\_d\,\|L\| \wedge 2 < 1, \text{ where } \|L\| = \max_{\|d\|\leq 1}\|Ld\| \quad \text{(Expression 10)}$$

In step S130, another variable is updated. Specifically, a_n_i is updated according to the following equation.

[Math. 11]

$$a\_n\_\{i+1\}(\hat{x}) = \begin{cases} d\_n\_\{i+1\}(\hat{x}) + \lambda\theta\_i & D\_n(\hat{x}) - d\_n\_\{i+1\}(\hat{x}) < -\lambda\theta\_i \\ d\_n\_\{i+1\}(\hat{x}) \cdot \lambda\theta\_i & \lambda\theta\_i < D\_n(\hat{x}) - d\_n\_\{i+1\}(\hat{x}) \\ D\_n(\hat{x}) & \text{otherwise} \end{cases} \quad \text{(Equation 11)}$$

In addition,
$\bar{d}\_n\_i$
is updated according to the following equation.

[Math. 12]

$$d\_n\_\{i+1\} = 2d\_n\_\{i+1\} - d\_n\_i \quad \text{(Equation 12)}$$

Furthermore, θ_i is updated by successively decreasing θ_i by some method. For example, update may be performed as the following equation, but the method is not limited.

[Math. 13]

$$\theta\_\{i+1\} = \eta\theta\_\{i\} \quad 0 \leq \eta < 1 \quad \text{(Equation 13)}$$

In step S132, it is determined whether cost function minimization of the nth tier is ended. The end determination of the cost function minimization in the nth tier may be performed in any manner, but there are end determination conditions, for example, as shown from the following a) to c).

a) A prescribed number of repetitions have been performed.

b) θ_i is less than a predetermined θ_end.

c) The norm of the difference between d_n_i and d_n_{i−1} is less than δ.

When the end determination is not satisfied, i=i+1 is set, returning to step S126, the dual variable (q_n_i), the primary variable (d_n_i), and other variables
(a_n_i, d_n_i, θ_n_i)
are updated.

Figure 11:
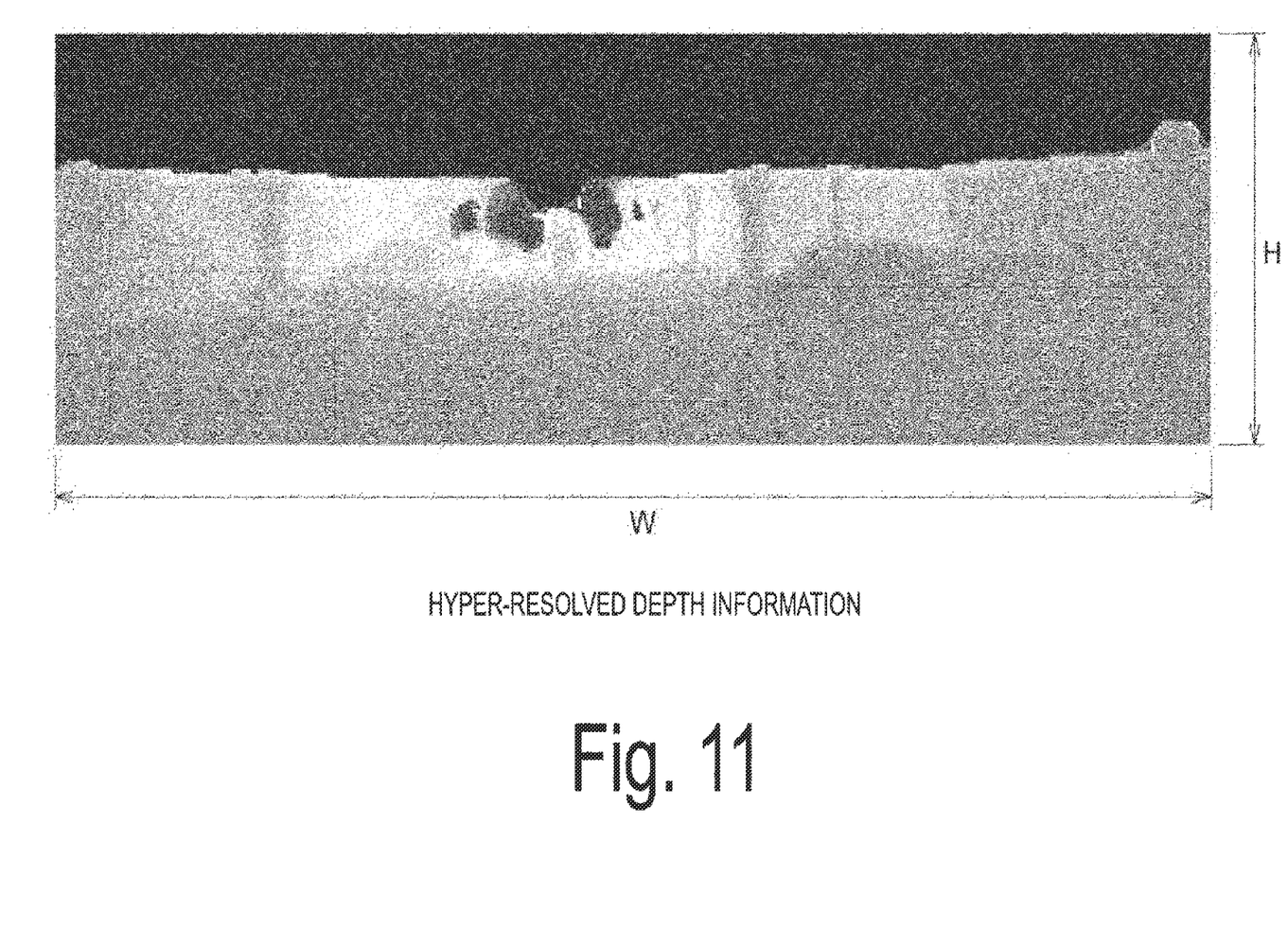
FIG. 11 is a diagram illustrating hyper-resolved depth information output by the depth hyper-resolving apparatus.

When the end determination conditions for cost function minimization in the nth tier are satisfied, in step S134, it is determined whether n is N−1 (i.e., the final tier). When n is less than N−1, n=n+1 is set to return to step S124, and initialization of the variables in the nth tier is performed. When n is N−1 (i.e., the final tier), the cost function minimization processing is ended, and the primary variable d_n_end is deformed to the width W and the height H to be output as the hyper-resolved depth information 56. An example of the output hyper-resolved depth information 56 is shown in FIG. 11.

Hereinafter, other calculation implementation methods of cost optimization calculation are described.

Instead of Equation 8 to Equation 13, a cost function of the form of Expression 6 in which θ and a_n are not introduced (Equation 6) can be minimized by the update equations shown in Equation 14 to Equation 17. The meaning and the range of values of the constants used are the same as the discussion from Equation 8 to Equation 13.

[Math. 14]

$$q\_n\_\{i+1\} = \quad \text{(Equation 14)}$$
$$\Pi((q\_n\_i + \tau\_qG\_nL\bar{d}\_n\_i)/(1+\tau\_q\epsilon))\Pi(p) = \frac{p}{\max(1, \|p\|\_2)}$$

[Math. 15]

$$d'\_n\_\{i+1\} = d\_n - \tau\_d(G\_nL \wedge Tq\_n\_\{i+1\}) \quad \text{(Equation 15)}$$

[Math. 16]

$$d\_n\_\{i+1\}(\hat{x}) = \begin{cases} d'\_n\_\{i+1\}(\hat{x}) & |d'\_n\_\{i+1\}(\hat{x})| < \lambda\tau\_d \\ d'\_n\_\{i+1\}(\hat{x}) - \lambda\tau\_d \cdot \text{sign}(d'\_n\_\{i+1\}(\hat{x})) & \text{otherwise} \end{cases} \quad \text{(Equation 16)}$$

[Math. 17]

$$\bar{d}\_n\_\{i+1\} = 2d\_n\_\{i+1\} - d\_n\_i \quad \text{(Equation 17)}$$

When the cost function of Expression 18 is minimized in place of Expression 4, cost function minimization calculation can be performed by the update equations in Equation 19 to Equation 23. The meaning and the range of values of the constants used are the same as the discussion from Equation 8 to Equation 13.

[Math. 18]

$$\operatorname*{argmin}_{d\_n}\|G\_nLd\_n\|\_\epsilon + \sum_{\hat{x}\in\Omega, D\_0(\hat{x})>0} \lambda|d\_n(\hat{x}) - D\_n(\hat{x})| \wedge 2 \quad \text{(Equation 18)}$$

[Math. 19]

$$q\_n\_\{i+1\} = \quad \text{(Equation 19)}$$
$$\Pi((q\_n\_i + \tau\_qG\_nL\bar{d}\_n\_i)/(1+\tau\_q\epsilon))\Pi(p) = \frac{p}{\max(1, \|p\|\_2)}$$

-continued

[Math. 20]

$$d\_n\_\{i+1\} = d\_n - \tau\_d\left(G\_nL \wedge Tq\_n\_\{i+1\} + \frac{1}{\theta\_i}a\_n\_i\right)\bigg/\left(1 + \frac{\tau\_d}{\theta\_i}\right) \quad \text{(Equation 20)}$$

[Math. 21]

$$a\_n\_\{i+1\}(\hat{x}) = (d\_n\_\{i+1\}(\hat{x}) + \lambda\theta\_i D\_n(\hat{x}))/(1 + \lambda\theta\_i) \quad \text{(Equation 21)}$$

[Math. 22]

$$\overline{d}\_n\_\{i+1\} = 2d\_n\_\{i+1\} - d\_n\_i \quad \text{(Equation 22)}$$

[Math. 23]

$$\theta\_\{i+1\} = \eta\theta\_\{i\} \quad 0 \le \eta < 1 \quad \text{(Equation 23)}$$

In the cost function minimization unit 30, any of the update equations from Equation 8 to Equation 13, the update equations from Equation 14 to Equation 17, and the update equations from Equation 18 to Equation 23 may be used.

As described above, according to the depth hyper-resolving apparatus according to the embodiment of the present invention, a hierarchical estimated depth continuity is derived based on a hierarchical input image, a hierarchical depth continuity mask is output based on the hierarchical input image and the hierarchical estimated depth continuity, and repetitive optimization calculation is performed to minimize a cost function expressed by the hierarchical input depth information, the hierarchical depth continuity mask, and hyper-resolved depth information to derive the hyper-resolved depth information, thereby allowing dense depth information to be generated using only sparse depth information measured by a sensor and a monocular image.

In addition, when a DNN that estimates depth information learns, only image information is used to facilitate acquirement of training data, and when hyper-resolving processing is performed, dense depth information can be generated using only a monocular image and sparse depth information.

The present invention can also be implemented in a manner that does not perform learning, and in this case, it is unnecessary to obtain training data, and it is possible to generate dense depth information using only a monocular image and sparse depth information.

The present invention is not limited to the above embodiment and various modifications and applications are possible without departing from the scope of the present invention.

For example, although the depth hyper-resolving apparatus described above has a computer system therein, it is assumed that the "computer system" also includes a website providing environment (or display environment) when a WWW system is used.

Further, although the embodiment has been described in which a program is installed in advance in the present specification, the program can also be stored and provided in a computer-readable recording medium or can be provided via a network.

REFERENCE SIGNS LIST

10 Input unit
20 Operation unit
22 Input data processing unit
24 Depth continuity estimation unit
26 Depth continuity mask deriving unit
28 Initial value deriving unit
30 Cost function minimization unit
32 Storage unit
40 Input image
42 Input depth information
44 Hierarchical input image
46 Hierarchical depth continuity mask
46 Hierarchical input depth information
48 Hierarchical estimated depth continuity
50 Output unit
52 Hierarchical depth continuity mask
54 Cost function minimization initial value
56 hyper-resolved depth information
100 Depth hyper-resolving apparatus

The invention claimed is:

1. A depth hyper-resolving apparatus, comprising:
an input data processing unit configured to output a hierarchical input image and hierarchical input depth information by resolution conversion in accordance with a predetermined number of tiers for an input image and input depth information;
a depth continuity estimation unit configured to derive hierarchical estimated depth continuity based on the hierarchical input image;
a depth continuity mask deriving unit configured to output, based on the hierarchical input image and the hierarchical estimated depth continuity, a hierarchical depth continuity mask representing values of locations depending on whether a depth is continuous; and
a cost function minimization unit configured to derive hyper-resolved depth information to minimize a cost function expressed by using the hierarchical input depth information, the hierarchical depth continuity mask, and the hyper-resolved depth information.

2. The depth hyper-resolving apparatus according to claim 1, further comprising
an initial value deriving unit configured to output a cost function minimization initial value based on the hierarchical input depth information, wherein
the cost function minimization unit derives the hyper-resolved depth information to minimize the cost function using the cost function minimization initial value.

3. The depth hyper-resolving apparatus according to claim 1, wherein the cost function minimization unit repeatedly updates a primary variable and a dual variable to minimize the cost function including the primary variable and the dual variable representing the hyper-resolved depth information.

4. The depth hyper-resolving apparatus according to claim 1, wherein the cost function is expressed including a product obtained by computing the hierarchical depth continuity mask and the hyper-resolved depth information with an operator, and a difference between the hyper-resolved depth information and the hierarchical input depth information.

5. A depth hyper-resolving method, comprising:
outputting, at an input data processing unit, a hierarchical input image and hierarchical input depth information by resolution conversion in accordance with a predetermined number of tiers for an input image and input depth information;
deriving, at a depth continuity estimation unit, hierarchical estimated depth continuity based on the hierarchical input image;
outputting, at a depth continuity mask deriving unit, based on the hierarchical input image and the hierarchical estimated depth continuity, a hierarchical depth continuity mask representing values of locations depending on whether a depth is continuous; and deriving, at a cost function minimization unit, hyper-resolved depth information to minimize a cost function expressed by using the hierarchical input depth information, the hierarchical depth continuity mask, and the hyper-resolved depth information.

6. The depth hyper-resolving method according to claim 5, further comprising
outputting, at an initial value deriving unit, a cost function minimization initial value based on the hierarchical input depth information, wherein
deriving at the cost function minimization unit includes deriving the hyper-resolved depth information to minimize the cost function using the cost function minimization initial value.

7. A computer readable recording medium storing a program for causing a computer to function as the depth hyper-resolving apparatus described in claim 1.

8. The depth hyper-resolving apparatus according to claim 2, wherein the cost function minimization unit repeatedly updates a primary variable and a dual variable to minimize the cost function including the primary variable and the dual variable representing the hyper-resolved depth information.

9. The depth hyper-resolving apparatus according to claim 2, wherein the cost function is expressed including a product obtained by computing the hierarchical depth continuity mask and the hyper-resolved depth information with an operator, and a difference between the hyper-resolved depth information and the hierarchical input depth information.

10. The depth hyper-resolving apparatus according to claim 3, wherein the cost function is expressed including a product obtained by computing the hierarchical depth continuity mask and the hyper-resolved depth information with an operator, and a difference between the hyper-resolved depth information and the hierarchical input depth information.

* * * * *